United States Patent Office 2,872,965
Patented Feb. 10, 1959

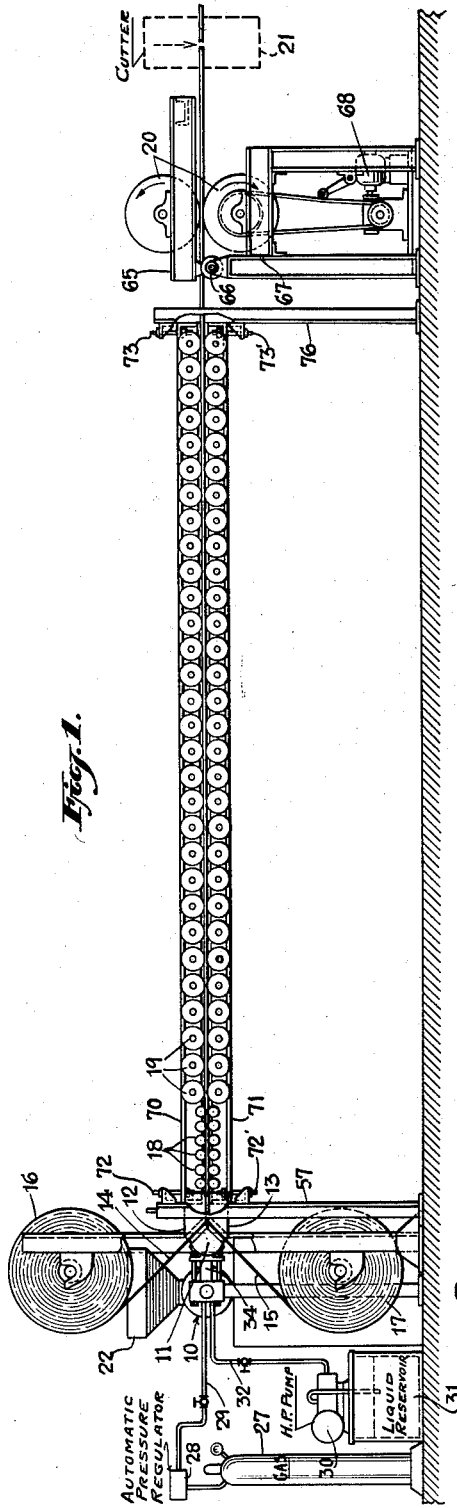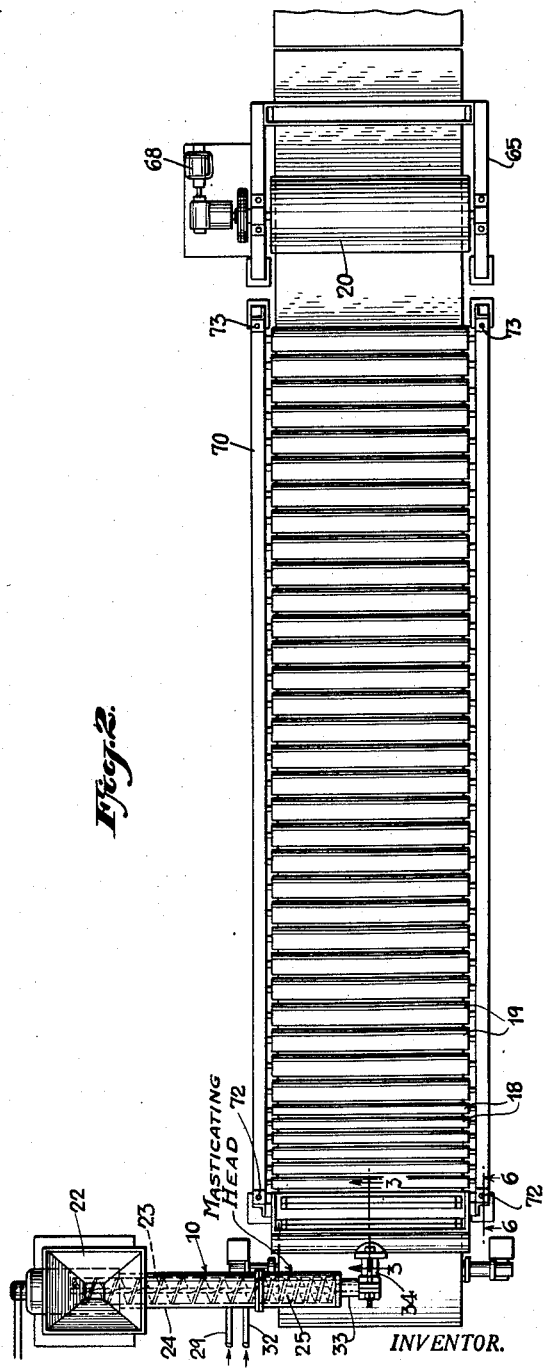

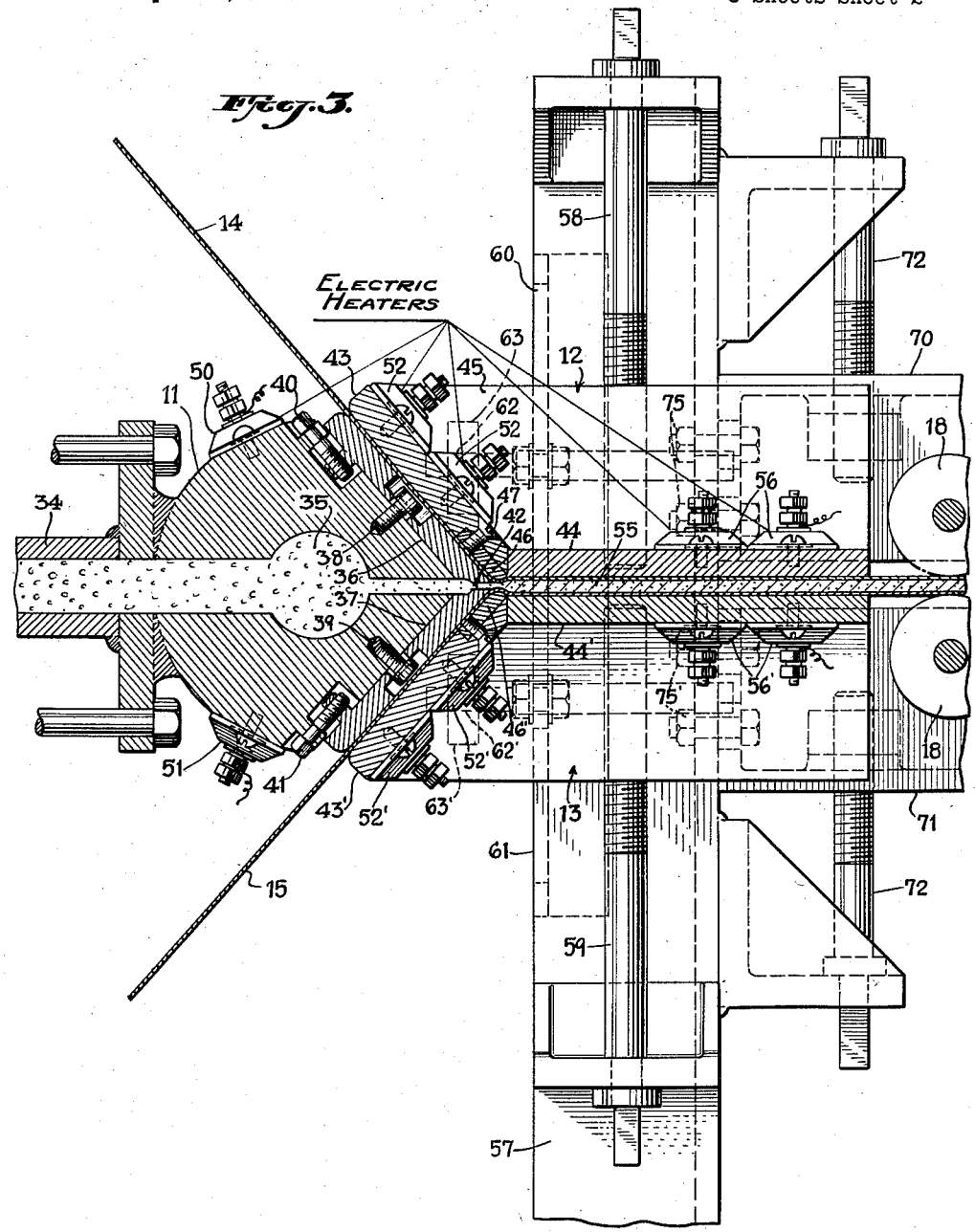

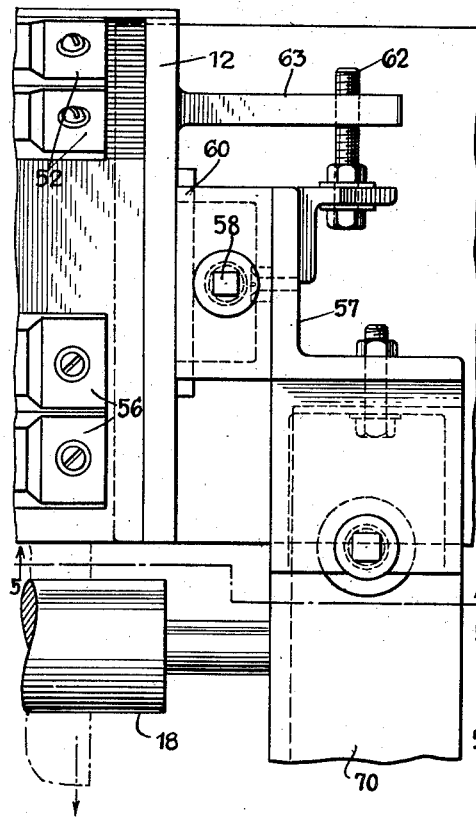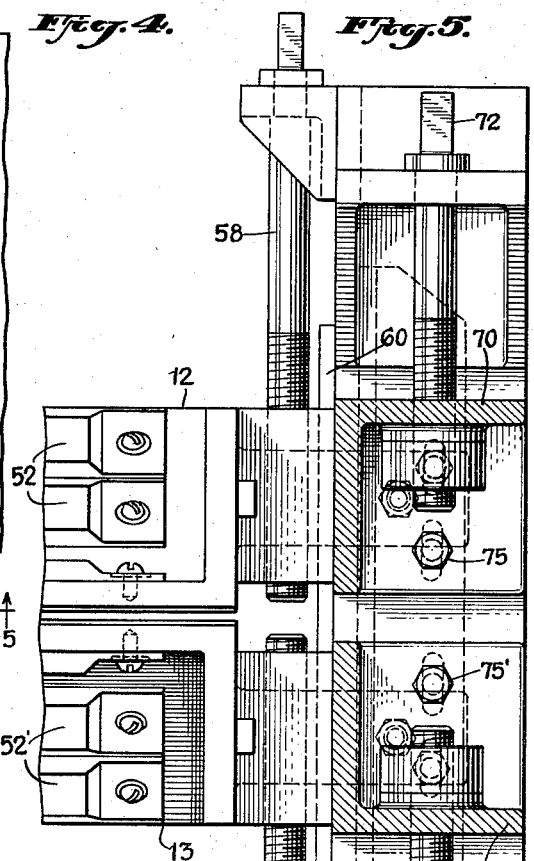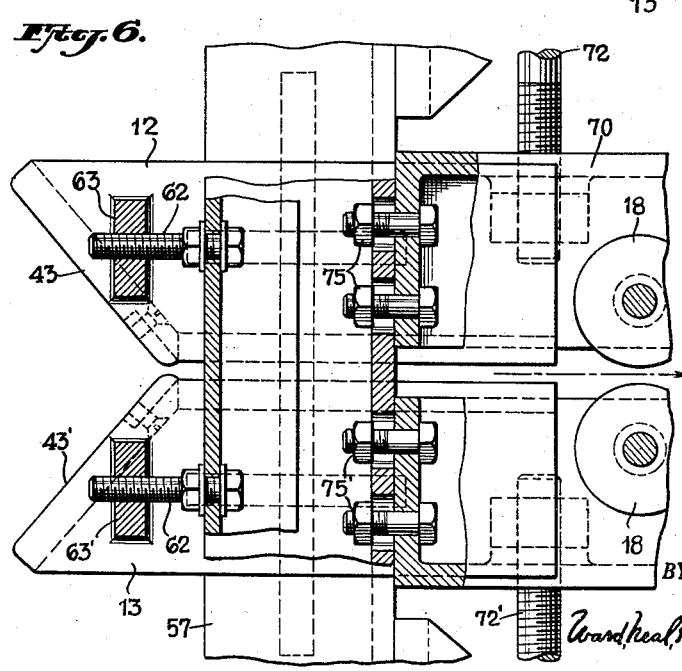

2,872,965

METHODS AND APPARATUS FOR FORMING SANDWICHES OF A FOAMED PLASTIC LAYER INTERPOSED BETWEEN WEBS OF SHEET MATERIAL

James B. Sisson, Carthage, N. Y., assignor to St. Regis Paper Company, New York, N. Y., a corporation of New York Application September 15, 1954, Serial No. 456,253

3 Claims. (Cl. 154—1)

This invention involves methods and apparatus for forming laminates or sandwiches comprising a foamed plastic layer interposed between and adhered to webs of paper or other normally flexible sheet material.

The invention, among other possibilites, is particularly adapted for forming sandwich material of a type adapted for forming shipping cartons and the like, as disclosed in the copending application of Gardiner Lane, Serial No. 439,765, filed June 28, 1954, now Pat. No. 2,770,406, reference to which hereby is made.

In order to form foamed plastic layers economically, it is desirable to continuously extrude the same under pressure through a suitable orifice so that as the plastic material in softened or viscous form leaves the orifice, any suitable foaming agent or material contained therein will cause the same to expand to form the desired foamed product. However, if as with the usual well-known processes of extruding plastic films, layers or the like, the extruded material is left unconfined, as in the case of a plastic containing a foaming or blowing agent, it will assume a corrugated shape after it leaves the extrusion orifice, if such orifice is in the form of an elongated narrow gap. Such corrugated shape results from the fact that as the extruded layer is released from confinement and is allowed to expand, while it may expand transversely of the orifice to a generally uniform expanded thickness, yet in directions longitudinally of the orifice, the total expansion will be so great that the layer will naturally assume a corrugated shape to accommodate the expansion longitudinally of the orifice. Furthermore, if the layer of extruded foamable plastic materials while still heated is unconfined, even for a relatively short distance, then the bubbles therein caused by the foaming agent will tend to be of variable and excessive sizes.

Furthermore, if the foamed layer is formed by extrusion and then allowed to expand and more or less set, and if it is formed of a commonly available inexpensive plastic, such as polystyrene for example, layers of paper and other flexible sheet material may not usually be securely affixed thereto to form a sandwich except by the use of additional layers or coatings of adhesive materials.

With the present invention, the above-noted difficulties are avoided and methods and apparatus are provided for efficiently and rapidly forming a sandwich of foamed plastic material interposed between sheets of paper or other flexible material, the invention being carried out by heating the sheets and continuously advancing same so that they converge into an opposed predetermined closely spaced relation, meanwhile a plastic material, which is normally a solid but which is heated to a softened condition and contains a foaming agent, is extruded through an orifice and thereafter confined by the heated webs to the space therebetween, such space preferably being of a shape and size to allow the plastic to expand to a desired limited degree only, to a foamed condition, filling the space and adhering between the heated webs of sheet material to form the desired sandwich therewith.

Various further and more specific objects, features and advantages of the invention will appear from the description given below, taken in connection with the accompanying drawings illustrating by way of example certain preferred forms of the invention.

In the drawings:

Fig. 1 is a side elevational view of a preferred assembly of apparatus for carrying out the invention;

Fig. 2 is a plan view of the same apparatus;

Fig. 3 is a sectional view taken substantially along line 3—3 of Fig. 2;

Fig. 4 is an enlarged top view of one corner portion of the extruding apparatus shown in Fig. 2;

Fig. 5 is a sectional view taken substantially along line 5—5 of Fig. 4; and

Fig. 6 is a sectional view taken substantially along the line 6—6 of Fig. 2.

Referring to the drawings now in further detail, the extruding appartus is shown at the left-hand portion of Fig. 1 and indicated generally by the numeral 10.

This apparatus has a die formed with an elongated horizontal orifice located at the apex of a horizontally positioned wedge-shaped extruder head 11. A pair of paper web guide means 12, 13 are positioned with face portions closely spaced from the faces of the wedge-shaped extruder head 11 to provide slots or passages respectively through which webs or sheets of paper 14, 15, or the like, are drawn from rolls as at 16, 17. The webs 14 and 15 converge to a closely spaced relation just at the outlet of the extruding die orifice so that the plastic material is extruded into the confined space therebetween. The webs pass on toward the right as viewed in Fig. 1, with the expanded and foamed plastic layer therebetween. The resulting sandwich then passes between numerous pairs of rollers as at 18, 19 while the sandwich becomes dry or cooled and the foamed plastic sets. Then the sandwich passes between a pair of pressure rollers as at 20, one of which at least is driven to thereby provide force for pulling the sandwich through the machine and for pulling the sheets or webs 14, 15 through their respective guides from the rolls thereof into the machine.

Finally, the finished sandwich material as it leaves the pull rollers 20 may pass into a cutter, as indicated at 21, of some suitable known form for cutting the material into desired lengths or areas for forming cartons or for other purposes.

The extruding apparatus, per se, such as indicated at 10 may, if desired, except for the arrangements at the die outlet, be of some suitable known form such for example as disclosed in the patent to J. L. McCurdy et al., No. 2,669,751, granted February 23, 1954, or British patent to E. I. duPont de Nemours & Co., No. 688,637, published March 11, 1953. Further, in the particular form somewhat schematically shown in Figures 1 and 2, the extruder may comprise a hopper 22 for receiving the plastic material, such as polystyrene, in granular form. From the hopper, a feed screw 23 forces the plastic through a cylindrical chamber 24, the walls of which are preferably heated if the plastic used is of a type which is to be softened or rendered viscous in order to extrude it.

From the hopper 24 the plastic material is advanced through a masticating head 25 of some suitable known form for thoroughly mixing the plastic with whatever foaming agent or other material is to be mixed therewith. The term foaming agent as used herein is intended to include so-called blowing agents generally, whether in liquid, gaseous or solid form, which act by chemical or catalytic reaction or mechanically to cause the plastic material, when extruded, to expand and become filled with fine gas bubbles, as a foam. If, for example, the foaming agent to be used is in the form of a gas, such as nitrogen or carbon dioxide, it may be introduced from a gas tank 27 (Fig. 1) through an automatic pressure regulator 28 and pipe 29 into the cylinder 24. If, for example, a liquid foaming agent is used, same may be pumped as by a positive displacement high-pressure metering pump 30 from a receiver 31 and through a pipe 32 into the cylinder 24. In either event, the foaming agent becomes thoroughly mixed in the mixing head with the plastic material and the mixture is constantly discharged through conduits as at 33, 34 into a central cavity 35 (Fig. 3) in the horizontal extruder head 11.

Referring now to Fig. 3 in further detail, the extruder head 11 preferably is formed with face plates as at 36, 37 which are slidably adjustable along planes positioned at 45° to the vertical as shown, such plates having slotted holes for receiving screws as at 38, 39, for retaining the plates in place. When these screws are loosened, the plates may be adjusted as by screws 40, 41, to thereby vary the width of the orifice at 42 through which the plastic material is extruded from the cavity 35.

The two sheet guide means 12 and 13 may be of like construction and accordingly only the upper guide means 12 will now be described in full detail. This may comprise a plate 43 having its face which engages the sheet 14 positioned at an angle of 45° to the vertical. This guide means also includes a horizontal plate 44 which, together with the plate 43, are suitably secured as by welding to a supporting portion 45. The lower edge of the plate 43 preferably is formed with a removable strip 46 detachably held in place as by screws 47. The lower edge of strip 46, as shown, is preferably somewhat rounded and is located along just above and beyond the upper edge of the orifice 42. By making the strip 46 and its corresponding opposed lower strip 46' removable, it is possible easily to replace same by other similar strips which will provide a greater or lesser gap through which the plastic passes just after it leaves the orifice 42 and thereby, as may be determined by trial, the rate and degree to which the foaming plastic is allowed to expand at this point may be varied by replacing the strips with ones having different lower edge contours.

In order to insure heating of the plastic within the extruder head 11 to the desired temperature, electrical heaters as at 50, 51 may be applied thereto and designed to be furnished with an adjustable current to adjust the degree of heating as desired. Similarly, to heat the paper sheet guiding means, electrical heaters as at 52, 52' may be used. The sandwich having the foamed plastic contained between upper and lower paper areas is indicated at 55 as it advances along beneath plate 44. To maintain the plate 44 and its corresponding opposed plate 44' and the sandwich therebetween in heated condition until the foaming action is completed to the desired degree, additional heaters as at 56, 56' may be used. It will be understood that all of the heaters may be supplied with heating current from an adjustable source.

In order to adjust the relative vertical spacing of the guide means 12, 13 for forming sandwiches of different thicknesses, these guide means may be adjustably supported from a supporting stand 57, the adjustments being accomplished by screws 58 and 59, suitable slideways as at 60 and 61 being provided for slidable engagement of the supporting stand 57 and the guide means 12, 13 respectively, as best shown in Figs. 3 and 5. Also, in order to accommodate the apparatus for paper or other sheet material of varying thicknesses and accordingly to adjust horizontally the position of the plates 43, 43', horizontally positioned adjusting screws as at 62, 62' are provided, which respectively engage lugs 63, 63' extending out from each end of the guide means 12 and 13. This is best shown in Fig. 4, which is a plan view of the portions at one end of the extruder head. This arrangement is also indicated in dotted lines in Fig. 3. It will be understood that like horizontal adjusting means is provided at both ends of the extruder assembly and both for the upper and for the lower guide means 12 and 13. Such horizontal adjustments of the guide means 12 and 13 will permit the gap through which the paper sheets 14, 15 slide, to be adjusted so as to just allow the sheets to slide through without binding, but without allowing clearance for the escape of any amount of plastic material from the orifice back along the surfaces of the sheets before they reach the orifice. Such horizontal adjustments of the guide means may also be desirable when the extruder plates 36, 37 are adjusted to change the orifice gap.

Upon emerging from between the plate portions 44, 44' (to the right as viewed in Fig. 1) the sandwich preferably first passes between numerous pairs of relatively small rollers 18 which will engage the sandwich at relatively closely spaced positions for holding the paper sheets under pressure against the foamed plastic until the latter has cooled somewhat, whereupon the sandwich passes on between further pairs of rollers 19, which may be larger and consequently more widely spaced as measured between their center lines. A sufficient number of the rollers 19 are provided to insure that the foamed plastic in the sandwich will have become cooled and permanently set before the sandwich passes on to the pull rolls 20. The pull rolls 20 may be of rubber or rubber-covered, if desired. The upper roller 20 may for example be mounted in a frame 65 pivoted as at 66 to a lower frame 67. Thus the weight of the upper roller 20, together with the frame 65 will bear down against the sandwich and press it against the lower roller 20 and as the latter is driven, as by an adjustable speed motor 68 belted thereto, the sandwich will be pulled through the machine to the cutter 21.

The pairs of rollers 18, 19 may be mounted on upper and lower frames as at 70, 71, and in order to adjust vertically the positions of these frames to accommodate sandwiches of different thicknesses, adjusting screws as at 72, 72', 73, 73' may be provided (Fig. 1). That is, as further shown in Figs. 5 and 6, the frames 70 and 71 respectively at the ends thereof nearest the extruder head, may be normally held and supported in place on the stand 57 as by bolts 75, 75' received in slotted holes formed in the supporting stand 57. And when these bolts are temporarily loosened, then adjusting screws 72, 72' may be used to adjust the roller-supporting frames 70, 71 as desired. It will be understood that the structure at the right-hand ends of the roller frames, as shown in Fig. 1, may be similar and supported on a stand 76. Usually the rollers are adjusted so that those of each pair are vertically spaced by a distance substantially equal to the spacing between the plates 44, 44', although by making the roller spacing slightly less, the paper sheets may be compressed against the foamed plastic more firmly to insure good adhesion, and a sandwich of uniform thickness.

In a typical case, the apparatus may be constructed to have an extruding orifice for example which is 30" long and which is adjusted to provide a gap of 0.016" more or less, in case polystyrene plastic is being used to form for example a sandwich having a thickness in the neighborhood of one-quarter inch. In that case, the plastic within the extruder head may be subjected to a pressure from 500 to about 1000 lbs. per sq. inch and assuming that the paper webs are advanced at a speed of about 17 feet per minute or a speed of that order. In a typical case, the electrical heaters may be adjusted to maintain the plastic in the extruder head at a temperature of about 250–350° F. (preferably about 350° F.), the paper preferably being heated to a like or similar temperature by the heaters 52, 52'. As the sandwich 55 advances between the heaters 56, 56', its temperature may be maintained at the same or at a lesser degree by the latter heaters, as may be determined by trial, and in order to insure that the sandwich does not cool until the space between the paper layers has been wholly and rather firmly filled by the expanding foamed plastic.

In case the sandwich is to be used for making cartons such as of the above-mentioned Lane specification, one may use therefor kraft paper for example of a weight of 126 lbs. per 3000 sq. ft. and having a finish such as generally used for example as corrugated paperboard liner sheets. However, it will be understood that other forms of paper or paper-like materials may be used, as well as sheets of other materials, so long as same will be flexible and will adhere, when heated, to the plastic being used.

While the use of polystyrene is presently preferred for forming the foamed plastic layer, because of its low cost and the ease with which it may be foamed into the desired somewhat copressible but somewhat soft product having great numbers of fine cells, yet it will be understood that other plastics might be used, such for example as polyvinyl chloride, among others.

Further specific data as to various examples of the foamed plastic material and foaming agents which may be used are given in the above-mentioned Lane specification.

In a typical case, when the extruding orifice 42 has a width for example of 0.016", the space between opposed edges of the strips 46, 46' may have a width at its narrowest point of 0.125", although, of course, this will vary depending upon the thickness of the paper used and the desired final thickness of the sandwich. While as indicated in Fig. 3, in the usual case the expanding plastic is not allowed, immediately upon emerging from the extruding orifice, to expand to the full thickness of the desired sandwich, yet in some cases, particularly if the sandwich is to be relatively thin, the opposed edges of the strips 46, 46' may be spaced apart substantially to the same distance as the spacing of the plates 44, 44'. In Fig. 3, the preferred proportions of the various spacings are indicated for making a sandwich one-quarter inch thick. If the desired sandwich is quite thin, the plastic as it leaves the orifice and foams, may be allowed to expand to the necessary degree by expanding forwardly along with the rapidly moving paper sheets without necessarily expanding substantially vertically or transversely of the orifice.

It will be apparent that the foamed plastic in the space 55 and between the hot advancing webs of sheet material will expand to fill such space under pressure against such webs and, since at least the surface portions of the foamed material at this region will be in heated condition and thus viscous, the expansive pressure will insure that the foamed surfaces, even though highly cellular, will be pressed into continuous uniform contact and firm bonded relationship throughout with the webs, the webs in turn being firmly backed by the hot platens 44, 44'. And as the resulting laminate passes on through the cooling zone at rollers 18, the bonding effect becomes permanent.

Although a preferred embodiment of the invention is herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Method for forming laminates of foamed plastic material with paper and the like sheet material which comprises: continuously extruding under pressure through a narrow elongated orifice a continuous layer of plastic material which is normally solid but which as extruded is heated to a viscous condition and so that the surfaces thereof are substantially at bonding temperature and embodies material which causes it to foam and expand as it emerges from the orifice; continuously pulling in heated condition two webs of the sheet material along paths whereby same engage the orifice-forming means on opposite sides of the orifice respectively, the webs then coming into closely spaced relation and being held in contact respectively with opposite surfaces of the plastic layer at the points where such layer emerges from the orifice to thereby immediately confine the emerging layer against uncontrolled expansion; and then further advancing said webs with the plastic layer therebetween and with the webs respectively slidably engaging heated platens which maintain the plastic layer at foaming temperature and which are so spaced apart as to allow a greater separation of the webs by a controlled amount under the expansive pressure of the heated plastic foam layer therebetween and whereby the heated webs become adhered to the foamed layer.

2. Apparatus for forming sandwich constructions of a layer of foamed plastic material between sheets of flexible material, which apparatus comprises in combination: means respectively for guiding and confining two continuously advancing webs of the sheet material in a predetermined opposed closely-spaced relation and thence along in a more widely spaced opposed confined relation; means for heating said guiding means to preheat the webs as they approach such closely-spaced relation and as same advance in such opposed confined relation; an extruder having heating means therefor and having an orifice between said webs at their positions of closely spaced relation for extruding a continuous layer of foaming plastic material heated at its surfaces substantially to bonding temperature, directly onto and under confinement between said webs at their closely-spaced position as the material is extruded from said orifice and whereby the extruded heated plastic is then allowed to expand to foamed condition and bond itself to said webs filling the space between the webs including where same are more widely spaced, said guiding means being shaped and positioned to cause the webs slidably to engage opposite sides of the orifice of the extruder to thereby confine the emerging foaming plastic to the space defined by the webs; and means for pulling the resulting sandwich through the apparatus thereby also to pull the sheets into the apparatus.

3. Method for forming laminated board-like material embodying a foamed plastic layer with paper and the like sheet material adhered by the plastic itself to the opposite surfaces thereof, which method comprises: continuously extruding under pressure through a narrow elongated orifice a continuous layer of plastic material which is normally solid but which as extruded is heated to a viscous and expanding and foaming condition; continuously advancing in heated condition two spaced-apart webs of the sheet material into contact with opposite surfaces of the extruded plastic foamed layer at a region where the layer emerges from the orifice and at least the surface portions of said layer are in heated viscous condition; further advancing said webs in spaced-apart relation with the foamed layer therebetween, through a bonding region in which the foamed layer expands and applies expansive pressure to said heated webs, the webs at such region being backed by heated platens against which the webs slidably bear, whereby the webs become adhered to the foamed plastic layer; the resulting plastic laminate then passing on through a cooling region, pulling force being applied to the laminate at a subsequent region for pulling the laminate through the bonding region and thereby also pulling the paper webs into said contact with the plastic layer.

References Cited in the file of this patent

UNITED STATES PATENTS

| 1,350,722 | Goodenberger | Aug. 24, 1920 |
| 1,641,403 | Derhoef | Sept. 6, 1927 |
| 1,829,802 | Kliefoth | Nov. 3, 1931 |
| 2,070,600 | Jenett | Feb. 16, 1937 |
| 2,154,333 | Kampfer | Apr. 11, 1939 |

(Other references on following page)

UNITED STATES PATENTS

| | | |
|---|---|---|
| 2,236,766 | Schneider | Apr. 1, 1941 |
| 2,309,306 | Fischer | Jan. 26, 1943 |
| 2,327,627 | Esselen | Aug. 24, 1943 |
| 2,377,846 | Dreyfus et al. | June 5, 1945 |
| 2,463,289 | Leguillon | Mar. 1, 1949 |
| 2,512,506 | Denis | June 20, 1950 |
| 2,537,311 | Lyon | Jan. 9, 1951 |
| 2,537,977 | Dulmage | Jan. 16, 1951 |
| 2,592,081 | Toulmin | Apr. 8, 1952 |
| 2,740,157 | McCurdy et al. | Apr. 3, 1956 |

FOREIGN PATENTS

| | | |
|---|---|---|
| 842,267 | Germany | Sept. 15, 1952 |
| 726,949 | Great Britain | Mar. 23, 1955 |

OTHER REFERENCES

Fields: Abstract of app. Ser. No. 153,704, published August 18, 1953.